United States Patent [19]

Lemke

[11] Patent Number: 4,669,011
[45] Date of Patent: May 26, 1987

[54] SLIDER ASSEMBLY WITH DYNAMICALLY POSITIONABLE TRANSDUCER

[75] Inventor: James U. Lemke, San Diego, Calif.

[73] Assignee: Eastman Kodak Company, Rochester, N.Y.

[21] Appl. No.: 730,137

[22] Filed: May 3, 1985

[51] Int. Cl.$^4$ .................... G11B 21/20; G11B 5/60
[52] U.S. Cl. ........................................ 360/103; 360/75
[58] Field of Search ............................ 360/103–105, 360/107, 109, 75

[56] References Cited

U.S. PATENT DOCUMENTS 3,614,579 10/1971 Fulton ................................. 318/676
3,863,124 1/1975 Pierce et al. ....................... 318/638

FOREIGN PATENT DOCUMENTS 57-210479 12/1982 Japan .................................. 360/103
1433943 4/1976 United Kingdom ............... 360/103

OTHER PUBLICATIONS

Patents Abstracts of Japan, vol. 7, No. 67, Mar. 19, 1983.
Patents Abstracts of Japan, vol. 6, No. 137, Jul. 24, 1982.
IBM Technical Disclosure Bulletin, vol. 26, No. 6, Nov. 1983.
Patents Abstracts of Japan, vol. 7, No. 274, Dec. 7, 1983.
Patents Abstracts of Japan, vol. 9, No. 156, Jun. 29, 1985.

Primary Examiner—A. J. Heinz
Attorney, Agent, or Firm—Robert F. Cody

[57] ABSTRACT

A flying head slider is flown above a rigid rotating magnetic disk at such a height that it is both aerodynamically stable and immune to collisions with disk asperities. A position adjustable magnetic transducer is mounted on the slider and is controllably lowered to an operating position very close to the disk where its position is maintained by a servo system. An anticipator probe detects the presence of asperities on the disk in the path traversed by the transducer, and generates a control signal which causes the transducer to be retracted to a safe height.

4 Claims, 6 Drawing Figures

SLIDER ASSEMBLY WITH DYNAMICALLY POSITIONABLE TRANSDUCER

BACKGROUND OF THE INVENTION

FIELD OF THE INVENTION

This invention relates in general to a flying head magnetic transducer used for recording data on a rigid rotating disk, and in particular to a transducer whose height above the recording surface is so dynamically controlled that the transducer remains in close proximity to the disk surface.

The invention, as well as the prior art, will be described with reference to the figures of which:

DESCRIPTION RELATIVE TO THE PRIOR ART

The disk data storage capacity of a flying head magnetic memory system is determined by the number of recorded tracks on the disk surface and the linear recorded density of the data of each track. Considerable engineering effort has been expended to increase the density of both of these parameters and, in the known prior art, storage systems utilizing about 800 tracks per inch and recording at a linear density of 10,000 bits per inch are available. This density of 10,000 bits per inch approaches the maximum attainable utilizing techniques currently known in the art. Such a limitation results from the finite separation between the magnetic transducer gap and the disk recording surface: Separation of the magnetic transducer gap and the recorded surface results in playback signal attenuation which is a function of such separation and the playback signal wavelength. It is known there is a loss of approximately 44 dB per wavelength of separation during recording ("The Effect of Spacing on Demagnetization in Magnetic Recording", N. Bertram and R. Niedermeyer, IEEE Transactions on Magnetics, Vol. Mag 18, Nov. 1982, p. 1206), and a loss of approximately 55 dB per wavelength of separation during playback ("The Complete Handbook of Magnetic Recording", Finn Jorgensen, Tab Books 1980, p. 82). The signal is attenuated by the sum of record separation loss and the playback separation loss resulting in an overall loss in accordance with the known relationship $$A = -99 \, d/\lambda$$

where A is the signal attenuation in dB, d is the separation and $\lambda$ is the signal wavelength. The shorter the wavelength, the greater the attenuation for a given separation; and since, in accordance with the Shannon theorem, two data bits are available per cycle of signal wavelength, an upper limit on the data density is established by the minimum wavelength that can be reproduced.

In the art, stable flight has been attained with the transducer at heights of $12\mu''$ ($\mu''$ = microinch) above the recorded surface. An acceptable playback signal level is assumed to be that which is attenuated by less than 6 dB relative to the theoretical zero separation signal value. Under these conditions, and using the previously stated relationship $$A = -99 \, d/\lambda$$

the minimum recorded wavelength, $$\lambda \min = \frac{99 \, d}{A} = \frac{99 \times 12 \times 10^{-6}}{6} \text{ inches} \simeq 200\mu''.$$

This corresponds to a bit packing density of 10,000 bits per inch attained with prior art systems.

Figure 1:
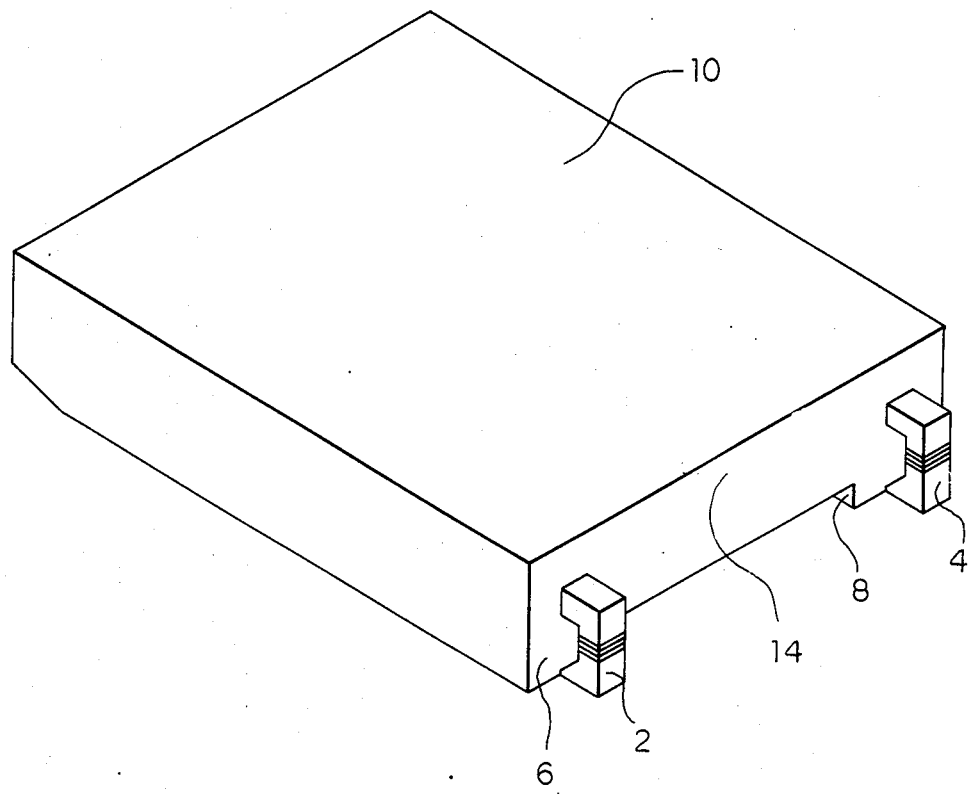
FIG. 1 is a perspective view of a slider and magnetic transducer assembly according to the prior art.

Further increases in linear density requires diminishing the separation between the magnetic transducer gap and the recorded disk surface. Reduction of separation to $4\mu''$ would allow a linear density of 30,000 bits per inch, while a reduction to $2\mu''$ would allow that of 60,000 bits per inch. FIG. 1 illustrates a typical slider assembly 10 known in the art, flyable at $12\mu''$, wherein magnetic transducers 2, 4 are rigidly bonded to the trailing edge 14 of slider rails 6,8. [It is not unusual practice to fabricate two transducer units, 2,4, on the slider 10, although only one is used in operation. The "better" transducer is selected during manufacture and wired into the associated record/playback circuit. Since a given slider assembly is used with only one unchangeable rigid disk, no compatability problems arise from this practice.] To reduce the magnetic transducer gap-to-disk separation using such a configuration requires reducing the flying height of the slider assembly itself. At separations on the order of $12\mu''$ and below, attempts to further decrease slider flying height lead to new and substantial problems. As the slider flying height is decreased, the air cushion depth between the transducer and the disk approaches the mean free path of the air molecules, which is $2.5\mu''$ at standard temperature (25 degrees C.); and stable flight becomes uncertain. Also, as flying height decreases roll mode instabilities, i.e. instabilities about an axis tangent to the flight path become more severe, and the rapid translation of the transducer in a radial direction occurring during track-to-track seeking leads to head-to-disk crashing.

Another problem occurring at low flying heights is due to asperities and irregularities present on the disk surface. These irregularities result from uncontrolled process effects arising while the disk is being coated with magnetic material, and consist of protrusions several microinches high randomly located on the disk surface. Debris and smoke particles present in the air may also adhere to the disk and form protuberances above the disk surface. These irregularities will be struck by very low flying sliders resulting in disturbances of slider flight stability with resultant crashing.

The present invention addresses these problems arising at very low flying heights, and provides a stable solution allowing minimal transducer-to-disk spacing with an attendant substantial increase in linear data density.

SUMMARY OF THE INVENTION

The invention teaches attachment of a magnetic transducer to a lengthwise controllable member at the trailing edge of a slider. (With the slider in its normal flying position relative to a rotating disk, the leading and trailing edges of the slider are so defined that a fixed point on the surface of the rotating disk passing below the slider first encounters the slider at its leading edge and then exits from under the slider at its trailing edge.) The slider is flown stably at about $20\mu''$ above the disk surface. When it is desired to record or playback, the lengthwise controllable member is actuated to lower and to maintain the magnetic transducer to within $2-4\mu''$ of the surface. An auxiliary servo system, using the magnetic transducer itself to sense transducer height above the disk surface, maintains the magnetic transducer at the specified height above the disk surface. Additionally, another height sensing transducer is located at the leading edge of the slider to detect the approach of disk asperities. If an asperity is detected during the record or playback operation, a signal is transmitted to the lengthwise controllable member and the magnetic transducer is retracted avoiding collision with the asperity. By so controlling the height of the magnetic transducer, linear densities of from 30,000 to 60,000 bits per inch may be safely recorded and played back: a factor of 3 to 6 improvement over that attainable in the prior art.

DESCRIPTION OF THE INVENTION

Figure 2:
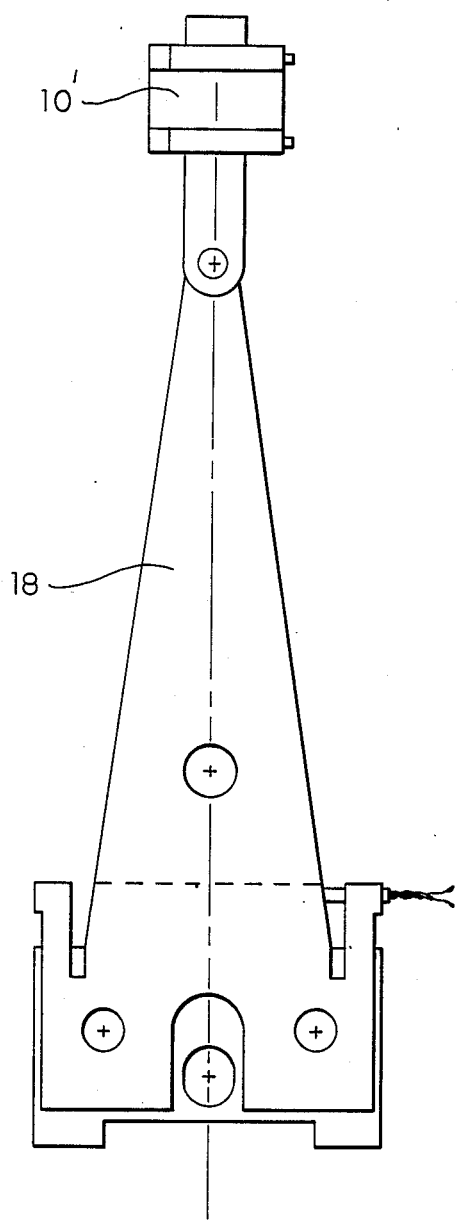
FIG. 2 is a plan view of a prior art slider and support arm.
Figure 3:
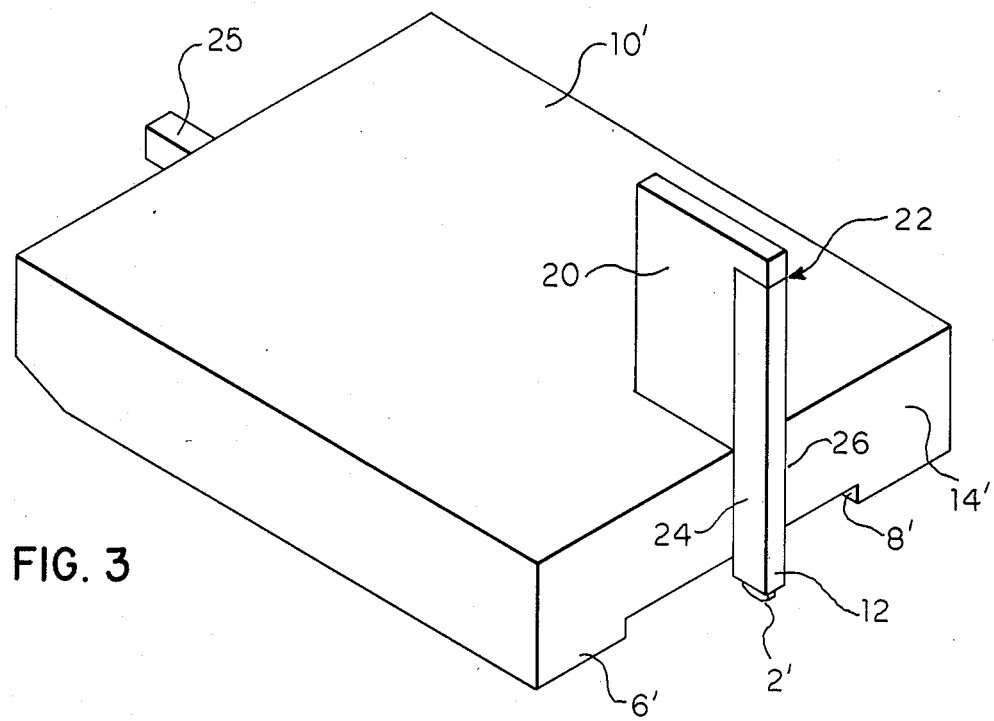
FIG. 3 is a perspective view of an improved slider according to the present invention.

Referring to FIGS. 2 and 3, an air bearing slider 10', fabricated in accordance with techniques known in the art, is provided with a length controllable element 12 located at its trailing edge 14'. [In the drawings different but related elements are identified with the same reference character, albeit that such corresponding elements in the various drawings are distinguished by the use of primes.] A magnetic transducer 2' is mounted on the lower surface of an element 12 with the transducer gap essentially flush with the bottom of the slider rails 6',8'. The length controllable element 12 and magnetic transducer 2' are attached to the slider body 10' by means of a support member 20. The element 12 is rigidly connected to the support member 20 exclusively at the upper surface 22 of the element 12, allowing the free extension and contraction of the element 12 in the manner described below.

The length controllable element 12 is fabricated from piezoelectric material which is extensible when subjected to an appropriately applied voltage. The element 12, of rectangular cross section, has metal plating on sides 24,26; and electrical connections are made to such plated areas. When a voltage of the correct polarity is connected to the sides 24,26, lengthwise extension of the element 12 occurs. Since the element 12 is fastened to the support member 20 exclusively at its upper surface 22, extension of the element 12 causes the transducer 2' to be lowered relative to the slider 10'.

FIG. 2, it will be appreciated, illustrates a typical slider support arm 18 used in the art for positioning the slider 10' and associated magnetic transducers 2,4 above the disk.

Figure 3A:
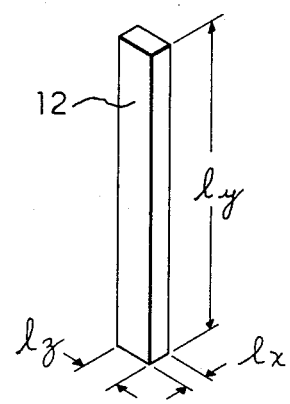
FIG. 3a illustrates the designation of the dimensions of an element (12) of FIG. 3.

The longitudinal extension due to the piezoelectric action of the element 12 is determined (see FIG. 3a) by the expression:

$$\frac{\partial \eta}{\partial y} = -S_{22}\frac{(F_y)}{S_y} + \frac{d_{12}E_x}{l_x} \tag{1}$$

("Fundamentals of Acoustics", Kinsler and Frey; John Wiley and Sons, Second Edition, p. 335).
where

| | |
|---|---|
| $E_x =$ | potential difference between the plated surfaces of the element, |
| $F_y =$ | compressional force applied parallel to the y axis, |
| $S_y = l_x \cdot l_z =$ | cross sectional area perpendicular to the y axis, |
| $l_x, l_y, l_z =$ | are respectively thickness, length, and width of the element 12, |
| $\frac{\partial \eta}{\partial y} =$ | longitudinal strain where $\eta$ represents the longitudinal displacement parallel to the y axis, |
| $d_{12} =$ | piezoelectric strain constant, |
| $S_{22} = 1/y_y =$ | elastic compliance parallel to y axis. |

In the present application, the element 12 is essentially unrestrained in the y direction, i.e. $F_y=0$ and equation (1) becomes:

$$\frac{\partial \eta}{\partial y} = \frac{d_{12}E_x}{l_x} \tag{2}$$

Figure 4:
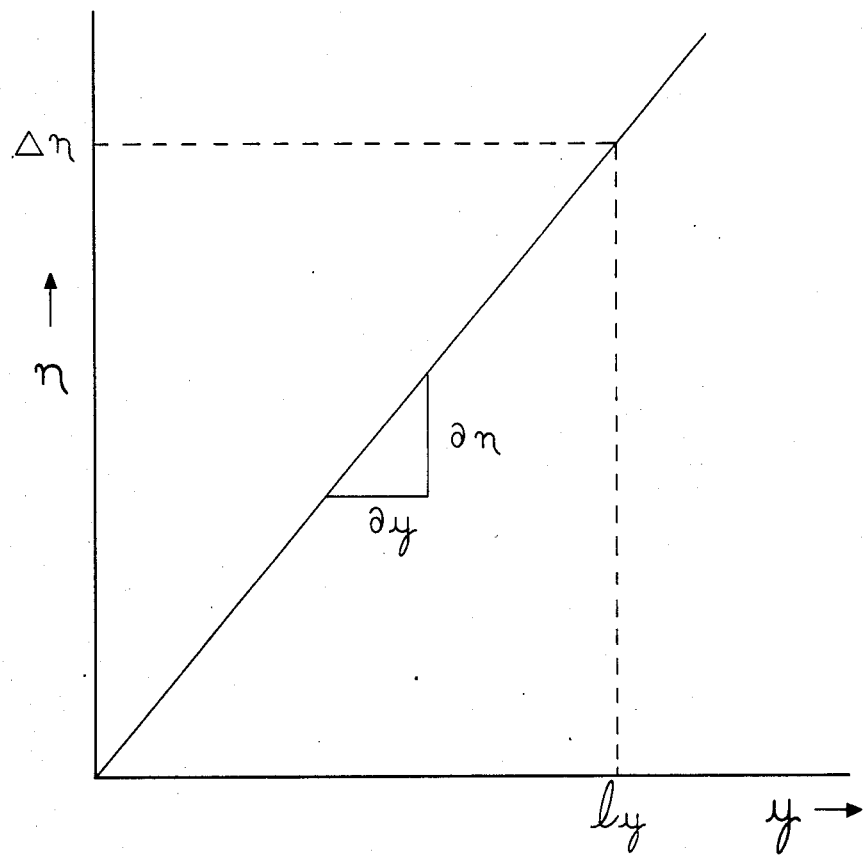
FIG. 4 depicts a graph useful in understanding the theory of the invention.

Assume, initially, that the servoing action which maintains the magnetic transducer at a specified height above the disk surface is deactivated, and that a fixed potential $E_x$ is applied to the element 12. During excitation of the element 12, the applied potential $E_x$ is constant, as are $d_{12}$ and $l_x$. Equation (2) shows that the longitudinal strain is therefore also constant and, under these conditions, as FIG. 4 illustrates, the displacement $\eta$ is a linear function of coordinate y along the length of the element 12. Since the slope $$\partial \eta / \partial y$$

is constant it is also equal to $$\Delta \eta / l_y,$$

as seen in FIG. 4, where $\Delta \eta$ is the extension of the element 12, of length $l_y$. Equation (2) now becomes:

$$\frac{\Delta \eta}{l_y} = \frac{d_{12}E_x}{l_x} \tag{3}$$

The concept of the present invention provides for exciting the element 12 to position the magnetic transducer 2' in extremely close proximity to the recording surface while the slider 10' is stably flying at a conveniently safe height i.e., at $20\mu''$ above the disk. At this height, to position the transducer 2' a distance of $2\mu''$ above the disk requires an $18\mu''$ increase in length, $\Delta \eta$, of the element 12. Acceptable values for $l_x$ and $E_x$ are $6 \times 10^{-3}$ inches and 100 volts, respectively, and a suitable piezoelectric strain constant is that of PZT-5, with $$d_{12} = 374 \times 10^{-12} \frac{\text{meter}}{\text{volt}} = 14.7 \times 10^{-9} \frac{\text{inches}}{\text{volt}} \quad (4)$$

The required length $l_y$ is then obtained from equation (3) after rearrangement:

$$l_y = \frac{\Delta \eta l_x}{d_{12} E_x} = \frac{18 \times 10^{-6} \times 6 \times 10^{-3}}{14.7 \times 10^{-9} \times 100} = .07'' \quad (5)$$

The element 12 dimensions suitable for positioning the transducer 2' within $2\mu''$ of the disk will be $l_x = 0.006''$, $l_y = 0.07''$ ... and $l_z$ may be selected to be $0.01''$. Using these parameter values, practice of the invention will allow recording to 60,000 bits/inch.

Figure 5:
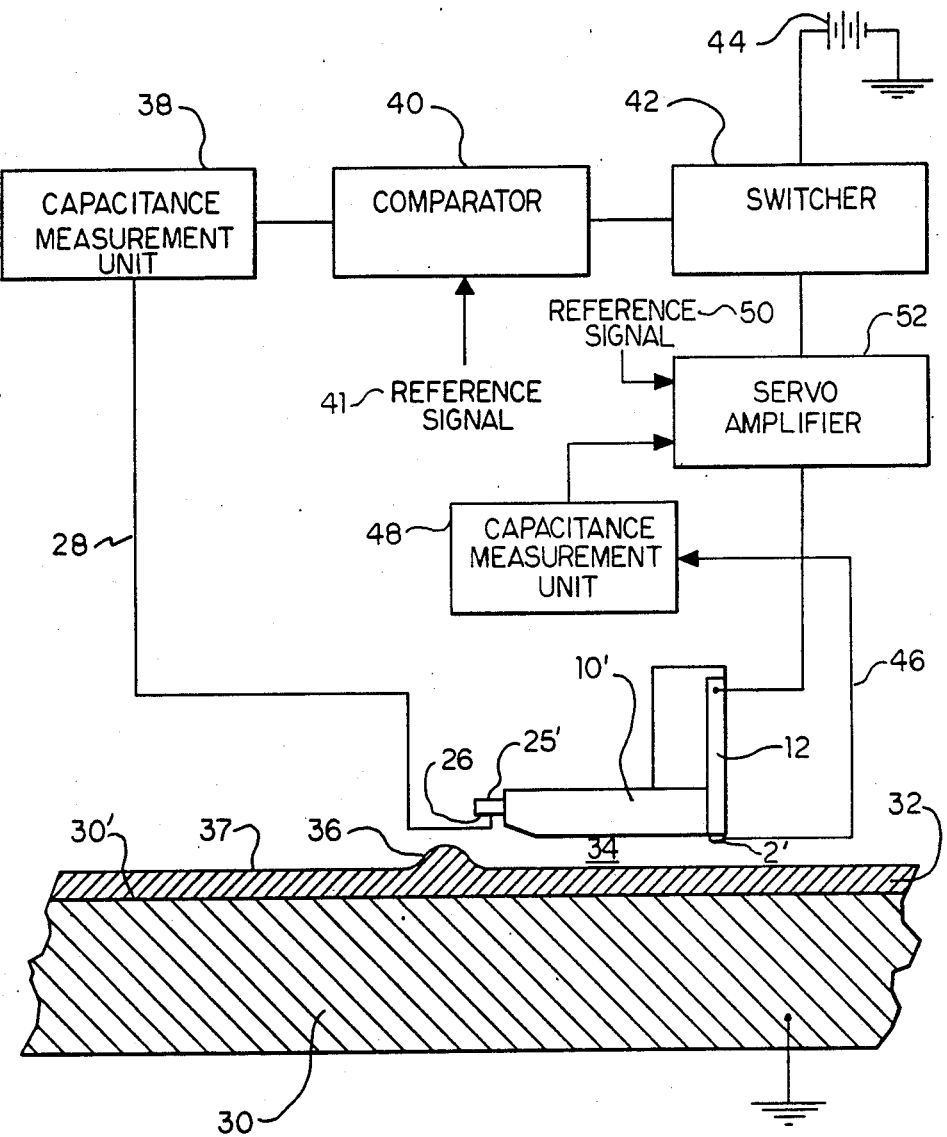
FIG. 5 is a schematic block diagram for the control of transducer height in the practice of the present invention.

FIG. 5 illustrates the operation of the invention with the slider assembly 10' flying above the disk surface 37, and the magnetic transducer 2' positioned for recording or playback. With the servo activated, the height of the magnetic transducer 2' above the disk surface 37 is maintained by means of continuous servo action, the magnetic transducer 2' serving the dual function of providing height information to the servo as well as the recording and playback of signal. The magnetic transducer 2' is fabricated from a material such as MnZn ferrite which has a resistivity of approximately 30 ohm-cm and, having such a relatively low resistivity, the magnetic transducer 2' may serve as one plate of a capacitor. The other plate of the capacitor is the metal surface 30' or, alternatively, and preferably, the coating 32 could serve as one of the capacitor plates since it could be made conductive i.e., by means of an included metallic film or a modified binder system to effect conductivity. The capacitance between the magnetic transducer 2' and the metal surface 30', or the conductive coating 32, is a measure of the height of the magnetic transducer 2' above the disk surface 37. An electrical connection 46 is made between the magnetic transducer 2' and a capacitance measurement unit 48. The output of the capacitance measurement unit 48 is a signal which is proportional to the height of the magnetic transducer 2' above the disk surface 37, and this signal is applied to a servo amplifier 52. A reference signal 50, corresponding to a specified height of the magnetic transducer 2' above the disk surface 37, is also applied to the servo amplifier 52. The difference between the reference signal 50 and the output signal of capacitance measurement unit 48 is an error signal which drives the servo amplifier 52. The servo amplifier 52 modulates the potential controlling the extension of the piezoelectric element 12, i.e. the voltage 44 transmitted through the switcher 42, and maintains the magnetic transducer 2' at the specified height corresponding to the reference signal 50.

Also pursuant to the invention, an anticipator element for detecting the approach of protuberant disk asperities is also provided, such anticipator element serving to signal the retraction of the magnetic transducer 2'.

FIG. 3 illustrates the location of the anticipator element 25, and FIG. 5 illustrates apparatus operatively cooperating with such element. In FIG. 5, the anticipator element 25 is implemented as a capacitive probe 25'. The lower surface 26 of the probe 25', which is integral with the slider 10', is metal plated, and provision is made for electrical connection (28) to the plating. This metallic plate forms one plate of a capacitor, the other of which is the metal surface 30' of the support disk 30 or the conductive magnetic coating 32. The capacitor thus consists of "plates" 26,30' (or 26, 32) and a layer of air 34 and the magnetic coating material 32. The dielectric constant of magnetic coating material is typically in the range 5-10. As an asperity 36 in the disk surface 37 approaches the probe 25', the capacitance increases causing a capacitance measurement unit 38 (of any well-known type) to provide an output signal proportional to the increased capacitance. This signal is compared to a preset reference in a comparator 40. When the capacitance change results in an output signal from the capacitance measurement unit 38 which exceeds the preset reference signal (corresponding to an asperity exceeding a given size), the comparator 40 applies a control signal to a switcher 42 which removes the applied voltage 44 from the piezoelectric element 12 allowing the retraction of the magnetic transducer 2'.

The invention has been described in detail with particular reference to preferred embodiments thereof, but it will be understood that variations and modifications can be effected within the spirit and scope of the invention.

What is claimed is:

1. An improved air bearing slider for transporting a magnetic transducer in relation to a relatively moveable magnetic medium, said slider having a leading edge and a trailing edge, wherein the improvement comprises:
   a. piezoelectric displacement means positionally connected to said slider for positioning said transducer towards and away from said medium,
   b. electrical excitation means cooperative with said piezoelectric displacement means for driving said displacement means, and
   c. distance detection means for measuring the distance of said magnetic transducer from said magnetic medium, said distance detection means having an electrical signal output cooperative with said excitation means, whereby said magnetic transducer is positioned relative to the surface of said magnetic medium,
   said distance detection means being in the form of a capacitative probe that is comprised in part of said magnetic transducer,
   said improvement further comprising second detection means for detecting surface irregularities of said magnetic medium, said second detection means having an electrical signal output for signalling the occurrence of said irregularities thereof, and said signal output cooperating with said electrical excitation means for controlling said piezoelectric displacement means,
   said second detection means being located at the leading edge of said slider, and being substantially in alignment with said magnetic transducer.

2. The improved air bearing slider of claim 1 wherein said second detection means is a capacitative probe.

3. An improved air bearing slider for transporting a magnetic transducer in relation to a relatively moveable magnetic medium, said slider having a leading edge and a trailing edge, wherein the improvement comprises:
   a. piezoelectric displacement means located at said trailing edge of said slider for supporting and positioning said magnetic transducer,
   b. electrical excitation means for driving said piezoelectric displacement means,
   c. first detection means for producing an electrical output signal, said detection means comprised in part of said magnetic transducer for determining the distance of said magnetic transducer with respect to said magnetic medium, and d. second detection means located at said leading edge of said slider for determining the presence of surface asperities of said magnetic medium, said second detection means having an output signal responsive to said presence of surface asperities, and said output signal being cooperative with said first detection means and with said electrical excitation means for controlling said piezoelectric displacement means to position said magnetic transducer relative to the surface of said magnetic medium.

4. The improved air bearing slider of claim 3 further comprising signal conditioning means responsive to said first and second detection means for controlling the operation of said excitation means.

* * * * *